Dec. 5, 1944. W. HUPPERT Re. 22,573

COMB

Original Filed April 18, 1942

INVENTOR
WILLIAM HUPPERT.
BY
ATTORNEY

Reissued Dec. 5, 1944

Re. 22,573

UNITED STATES PATENT OFFICE 22,573

COMB

William Huppert, New York, N. Y., assignor to Delamere Company Inc., a corporation of Delaware Original No. 2,316,335, dated April 13, 1943, Serial No. 439,527, April 18, 1942. Application for reissue August 2, 1943, Serial No. 497,059

5 Claims. (Cl. 132—21)

This invention relates to a comb of the hair retaining type that is used to keep the hair in place. Examples of such combs are shown in my patents Reissue No. 21,131 of June 27, 1939, and Reissue No. 22,035 of February 24, 1942.

The principal objects of the present invention are to provide a comb of this type that will lie flat in the hair, that will effectually grip the hair so as to prevent the comb from slipping or the hair from becoming disarranged, and that can be easily and inexpensively molded or shaped from plastic material.

A further object of the invention is to provide a comb comprising a set of teeth and a connecting rib formed in one piece and having a separate piece secured to the connecting rib to give the comb back increased rigidity and shape stability.

Further advantages of the invention will appear from the following description thereof, reference being had to the accompanying drawing, in which—

Figure 1:
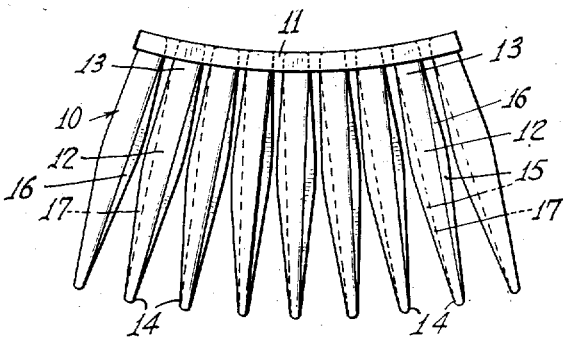
Figure 1 is a front plan view of the comb in the position in which it is initially formed.
Figure 2:
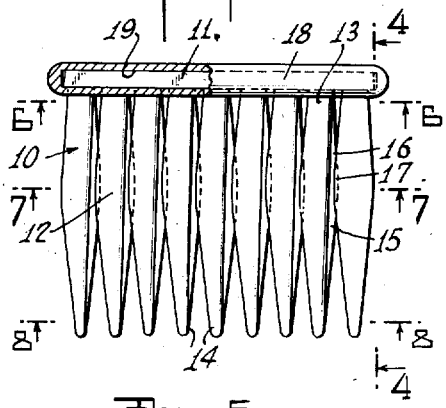
Fig. 2 is a front plan view, partly in section, of the finished comb.
Figure 3:
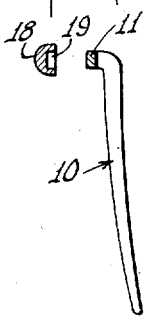
Fig. 3 is an end view in elevation, partly in section, showing the back-bar in position to be applied to the comb.
Figure 4:
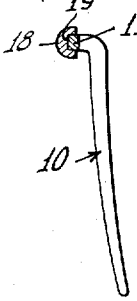
Fig. 4 is a similar view showing the comb with the back-bar applied.
Figure 5:
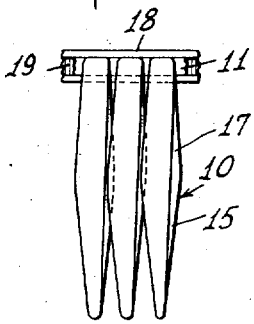
Fig. 5 is a fragmentary rear plan view of the comb.
Figure 6:
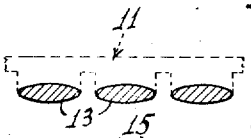
Figs. 6, 7 and 8 are views in section of the comb teeth through their root, intermediate portions, and ends, respectively.

The comb may be made of plastic or other suitable material, and is shaped, either by molding it, or by stamping it from a blank of the material, with the teeth 10 spread radially or in fan-like formation and with the forwardly projecting connecting rib 11 curved upwardly, substantially as shown in Fig. 1. This manner of manufacture facilitates the proper shaping of the teeth. The rib is then straightened, preferably under heat, to bring the teeth into their parallel, lapped position shown in Figure 2.

Figure 7:
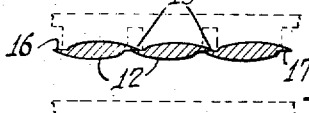
Figure 8:
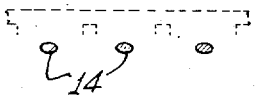

Each tooth has a wide portion 12 intermediate and tapering towards its upper or root end 13 and its lower end or point 14. The lateral edges of the teeth, particularly through the widened portions thereof, are formed with rabbets 15 having oppositely facing flat surfaces 16 and 17. These flat surfaces, as seen in Fig. 7, are disposed in a common plane so that the edges of the teeth will lie flush against each other in lapped relation.

The back-bar 18 is separately molded or formed, either of the same, or of a different material, from that of the comb proper. The bar is formed with a longitudinal slot 19 in its rear face of suitable length, width and depth to receive the connecting rib 11. The back-bar as shown has a curved front face and ends but it is evident that it may be made of any suitable shape and size, and ornamented or decorated in any desired manner.

In assembly, the rib 11, after it has been straightened, is inserted in the slot 19 and secured to the bar 18 by cementing or otherwise fastening the parts together. The bar gives the comb back increased rigidity, an attractive appearance, and serves to hold the rib and teeth in position.

The comb and back may be curved lengthwise to conform to the curvature of the head as is usual in combs of this type.

While I have described and illustrated a preferred embodiment of the construction, it will be understood that modifications may be made therein without departing from the scope of the invention.

I claim:

1. A hair retaining comb comprising a plurality of teeth having lapped lateral edge portions, a forwardly projecting rib formed integral with and connecting the upper ends of the teeth, and a separate bar having a recess in its rear face in which the rib is received and permanently secured to hold the teeth in lapped position.

2. A hair retaining comb comprising a set of teeth initially spread in fan-like formation, a rib formed integral with and connecting the upper ends of the teeth, said teeth having widened intermediate portions provided with oppositely facing rabbets along their lateral edges, and a separate bar permanently secured to the rib to hold the teeth in position with their rabbeted edges in lapped relation.

3. A hair retaining comb comprising a set of teeth integrally connected together at their upper ends, said teeth each having a widened intermediate portion provided with rabbeted lateral edges that lap the corresponding rabbeted edges of adjacent teeth.

4. A hair retaining comb comprising a set of teeth integrally connected at their upper ends, said teeth each having a widened intermediate portion provided with rabbeted lateral edges having oppositely facing flat surfaces that lap the corresponding flat surfaces of the rabbeted edges of adjacent teeth.

5. A hair-retaining comb comprising a plurality of teeth having hair gripping portions substantially contacting each other, a relatively flexible initially deformed rib of molded plastic material integral with the teeth and connecting them at their upper ends, said rib projecting at an angle to the plane of the teeth, and a relatively rigid separate comb back member permanently secured to the rib to hold it in fixed position against its inherent tendency to return to its initially deformed shape.

WILLIAM HUPPERT.